United States Patent
Frayman et al.

(10) Patent No.: US 8,161,060 B2
(45) Date of Patent: Apr. 17, 2012

(54) METHODS AND SYSTEMS FOR IDENTIFYING, ASSESSING AND CLEARING CONFLICTS OF INTEREST

(75) Inventors: Yuri Frayman, Sunny Isles Beach, FL (US); Serge Danilov, Brooklyn, NY (US); Alp Hug, Thornhill (CA)

(73) Assignee: The Frayman Group, Inc., Brooklyn, NY (US)

( * ) Notice: Subject to any disclaimer, the term of this patent is extended or adjusted under 35 U.S.C. 154(b) by 267 days.

(21) Appl. No.: 12/642,701

(22) Filed: Dec. 18, 2009

(65) Prior Publication Data

US 2011/0093453 A1   Apr. 21, 2011

Related U.S. Application Data

(60) Provisional application No. 61/252,993, filed on Oct. 19, 2009.

(51) Int. Cl.
G06F 7/00 (2006.01)
G06F 17/30 (2006.01)

(52) U.S. Cl. .................................. 707/758; 707/723
(58) Field of Classification Search .................. None
See application file for complete search history.

(56) References Cited

U.S. PATENT DOCUMENTS

| | | | |
|---|---|---|---|
| 5,774,866 A | 6/1998 | Horwitz et al. | |
| 7,140,035 B1 | 11/2006 | Karch | |
| 7,269,584 B2 * | 9/2007 | Settle, III | 707/784 |
| 2002/0091598 A1 * | 7/2002 | Farkas | 705/30 |
| 2003/0126100 A1 | 7/2003 | Chithambaram | |
| 2003/0236751 A1 * | 12/2003 | Settle, III | 705/51 |
| 2006/0041441 A1 | 2/2006 | Framme, III et al. | |
| 2006/0143231 A1 | 6/2006 | Boccasam et al. | |
| 2006/0184457 A1 * | 8/2006 | Sanderlin | 705/80 |
| 2006/0227952 A1 | 10/2006 | Cohen et al. | |
| 2008/0091682 A1 | 4/2008 | Lim et al. | |
| 2008/0312984 A1 | 12/2008 | Molloy | |
| 2009/0113312 A1 * | 4/2009 | Schoenberg | 715/753 |
| 2009/0164278 A1 * | 6/2009 | Sewell et al. | 705/7 |
| 2009/0248465 A1 * | 10/2009 | Recce et al. | 705/7 |
| 2010/0106738 A1 * | 4/2010 | Anderson | 707/769 |

OTHER PUBLICATIONS

"U.S. Appl. No. 12/642,701, Supplemental Preliminary Amendment filed Oct. 25, 2010", 8 pgs.
"U.S. Appl. No. 12/709,415, Preliminary Amendment mailed Mar. 17, 2010", 4 pgs.
"International Application Serial No. PCT/US 10/23259, Search Report mailed Dec. 14, 2010", 4 pgs.
"International Application Serial No. PCT/US10/53251, Search Report mailed Dec. 16, 2010", 4 pgs.

(Continued)

*Primary Examiner* — Kuen Lu
*Assistant Examiner* — Tuan A Pham
(74) *Attorney, Agent, or Firm* — Schwegman, Lundberg & Woessner, P.A.

(57) ABSTRACT

Methods and systems for identifying, assessing and clearing conflicts of interest are described herein. Consistent with some embodiments, a conflicts management system receives a conflict search request, and processes the request utilizing a risk matrix that encompass and represents the risk tolerance or risk profile of a law firm. The risk matrix maps certain request types to different search queries and rules that are to be evaluated for a given request type. Based on the execution of the queries and the rules for the request, a score is assigned to a party, such that the score represents the level of risk that would be undertaken if the party was engaged as a client.

19 Claims, 10 Drawing Sheets

OTHER PUBLICATIONS

"International Application Serial No. PCT/US10/53251, Written Opinion mailed Dec. 16, 2010", 9 pgs.

"International Application Serial No. PCT/US2010/053259, Written Opinion mailed Dec. 14, 2010", 10 pgs.

* cited by examiner

|  | RULE 1 | RULE 2 | RULE 3 | RULE 4 | RULE 5 | RULE 6 | RULE 7 | RULE 8 |
|---|---|---|---|---|---|---|---|---|
| QUERY TYPE 1 |  | X |  |  |  |  |  |  |
| QUERY TYPE 2 |  |  |  |  |  |  |  | X |
| QUERY TYPE 3 |  |  | X | X |  |  |  |  |
| QUERY TYPE 4 | X |  |  |  |  |  |  |  |
| QUERY TYPE 5 |  |  |  |  | X | X |  |  |
| QUERY TYPE 6 |  | X |  |  |  |  |  |  |
| QUERY TYPE 7 |  | X |  |  |  | X |  |  |
| QUERY TYPE 8 |  |  |  | X |  |  |  |  |

RISK MATRIX 134

ETHICAL RULES

IF [New-Client's Business-Name] EQUALS [Existing-Adverse-Party's Business-Name] THEN Apply Risk Score "High".

IF [New-Adverse-Party's Business-Name] EQUALS [Existing-Client's Business-Name] THEN Apply Risk Score "High".

IF [New-Client's Subsidiary's or Parent Company's Business-Name] EQUALS [Existing-Adverse-Party's Business-Name] THEN Apply Risk Score "High".

IF [New-Adverse-Party's Subsidiary's or Parent Company's Business-Name] EQUALS [Existing-Client's Business-Name] THEN Apply Risk Score "High".

BUSINESS RULES

- IF New-Client.CreditRating < BBB THEN Apply-Score "Medium". For each negative tick in rating down from BBB, raise score by 1%, up to maximum of "High".
- IF NM.EstimatedRevenue < 1/50,000 of NC.AnnualRevenue THEN Apply-Score "Medium".
- IF NM.EstimatedRevenue > 2 x MAX(CC.MatterRevenue) THEN Apply-Score "Low".
- IF CC.Industry = (CC.Industry OR CC.Affiliate.Industry) THEN Apply-Score "Low". (Could be competitor of current client)
- IF NC.Industry = PendingCGFlowRequests.Industry THEN Apply-Score "Low". (Could be competitor of another new client)
- IF NC.AnnualRevenue < 10% of CC.AverageRevenue THEN Apply-Score "Low".

FIGURE 5

METHODS AND SYSTEMS FOR IDENTIFYING, ASSESSING AND CLEARING CONFLICTS OF INTEREST

RELATED APPLICATIONS

This patent application claims the benefit of the filing date of the provisional patent application with Application Ser. No. 61/252,993, filed on Oct. 19, 2009, entitled, "Methods and Systems for Identifying, Assessing and Clearing Conflicts of Interest," which is hereby incorporated herein by reference.

TECHNICAL FIELD

The present disclosure generally relates to knowledge-based systems. More specifically, the present disclosure relates to methods and systems for identifying, assessing and clearing conflicts of interest.

BACKGROUND

In the legal profession, before an attorney (or a law firm) can engage and represent a potential new client, or represent an existing client in a new matter, the attorney (or law firm) must ensure that the new client representation does not, and will not, present a conflict of interest. In general, a conflict of interest exists when the representation of the new client (or the new matter for the existing client), results in a situation where an attorney's duty of loyalty to an existing client cannot be properly discharged due to the existing client having an interest adverse to the new client. For instance, a classic example is a divorce or child custody proceeding, in which it is generally impermissible for an attorney (or law firm) to represent both parties to the proceeding. In some situations, an actual conflict of interest can be waived by the client if the attorney (or law firm) seeks and obtains informed written consent from all affected clients. However, in other situations, a conflict of interest cannot be waived by a client.

A prohibited or undisclosed client representation involving a conflict of interest can subject an attorney to disciplinary hearings, the denial or disgorgement of legal fees, or in some cases (such as the failure to make mandatory disclosure), criminal proceedings. In some jurisdictions, a law firm typically cannot represent a client if the firm's interests conflict with those of another client, even if separate attorneys within the firm represent the adverse parties, unless the attorneys are segregated from the rest of the firm for the duration of the representation causing the conflict. Law firms often employ software-based systems in conjunction with their case management and accounting systems in order to meet their duties to monitor their conflicts of interest exposure, and to assist in obtaining waivers. However, a number of problems exist with the conventional software systems and techniques used for identifying the existence of potential conflicts, and clearing those potential conflicts.

A few of the many inefficiencies and problems that arise are described in connection with the illustration of a conventional workflow 10 for performing a conflict check, as illustrated in FIG. 1. First, after an attorney is contacted by a potential new client requesting representation 12, the attorney will communicate to a junior conflicts clearance analyst the information necessary to run an initial conflict check, which results in the generation of a conflicts check report 14. With many conventional software-based conflict clearance systems, there is but one interface to the system and that is generally targeted toward a conflicts analyst whose primary responsibility is interacting with the software to generate reports. Accordingly, there generally is no interface through which an attorney can interact with the conflict clearance system, and therefore the attorney is directly dependent upon the availability, skill and knowledge of a conflicts analyst.

Next, after receiving the necessary information from the attorney, the junior conflicts analyst uses the information provided by the attorney to expand the list of potential parties and to generate and process a search query 16. With many conventional conflicts checking and clearance systems, this operation is as much an art as it is a skill, and frequently depends upon the conflicts analyst's personal knowledge. For instance, if the conflicts analyst is personally familiar with an identified party, the conflicts analyst may have the necessary knowledge to expand the list to include the appropriate additional parties, for example, such as those with a direct affiliation to the identified party. In any case, with conventional conflict clearance systems, this step is both time consuming and has varied results.

Again referring to the conventional workflow 10 for processing a conflicts query, after generating and processing the search query, the junior conflicts analyst analyzes the initial search results to eliminate any obvious false positives, and in some cases, to refine and re-process the search query 18. Once satisfied with the search results, the junior conflicts analyst prepares a formal conflicts report, which may then be communicated to a senior analyst (or attorney) for review. The senior analyst (or attorney) may use his personal knowledge of informal business rules known to be in place and enforced by the firm to eliminate certain parties identified in the report, and/or modify or enhance the report 20, before providing the report to the attorney who initially requested the conflicts check 22. Here again, the process is highly dependent upon the personal knowledge of those persons participating in the process. This is problematic for a variety of reasons. First, if a key player in the conflicts checking and/or clearing process leaves the firm, so too does a wealth of knowledge used in processing conflicts checking and clearance requests. Additionally, because there may be several persons performing the same processing operations, the result of a particular search request will be highly dependent upon which personnel performed each processing step. As such, the results of multiple searches can vary greatly from request to request, resulting in conflicting reports that cause confusion and uncertainty. Moreover, as many of the processing steps are dependent upon personal knowledge of those doing the processing—such as the expanding of the parties included in the search query and the manual application of informal business rules—critical decisions are often not documented. If problems arise in the future with respect to a particular client representation, there may not be sufficient documentation to properly assess whether proper care was taken to avoid a conflict in the first place.

DESCRIPTION OF THE DRAWINGS

Some embodiments are illustrated by way of example and not limitation in the Figures of the accompanying drawings, in which:

FIG. 5 is a diagram illustrating a risk matrix and several example rules, according to an embodiment of the invention;

DETAILED DESCRIPTION

Figure 1:
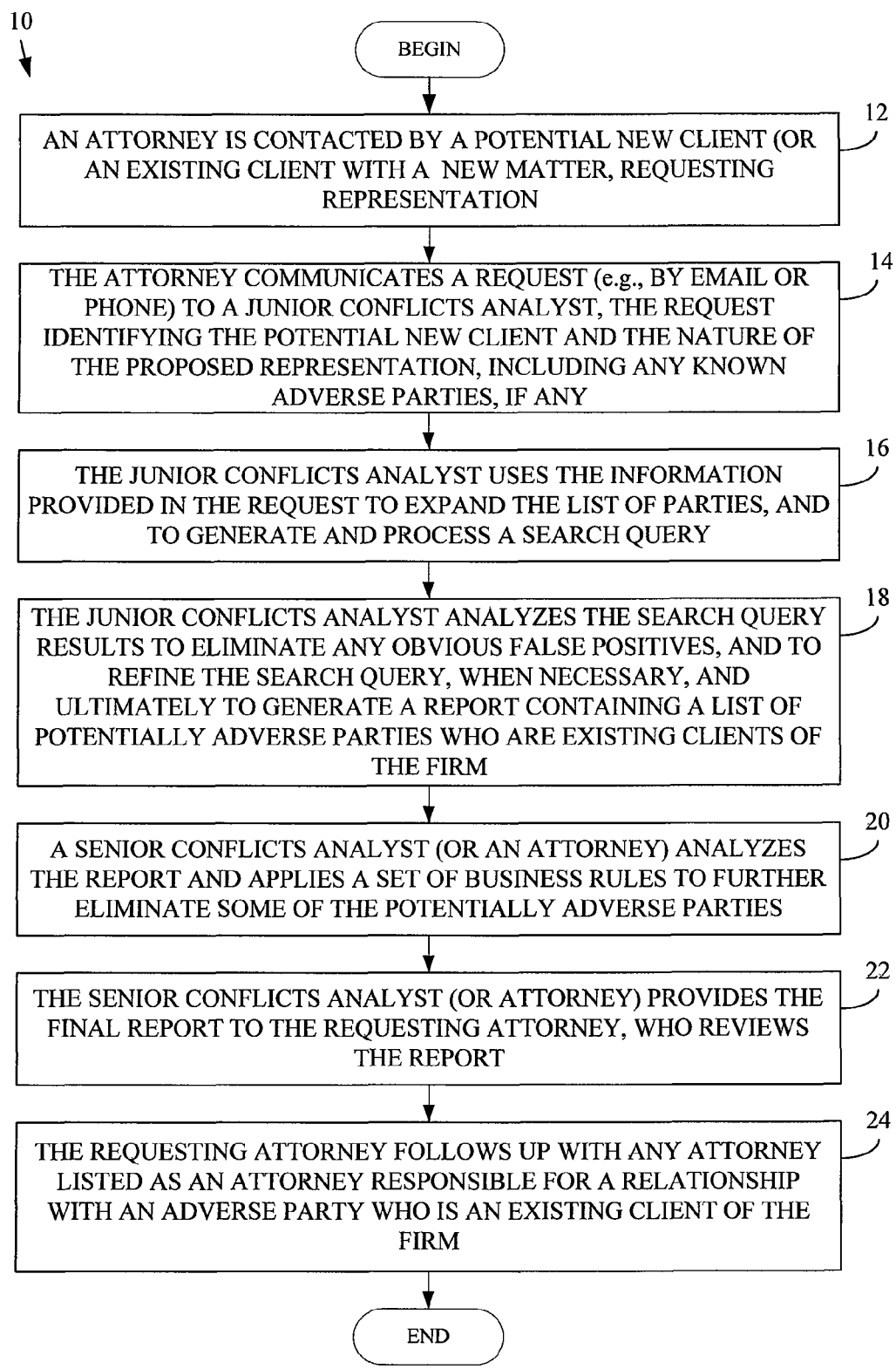
FIG. 1 is a workflow diagram showing the various operations involved in a conventional procedure for performing a conflict check.

Methods and systems for identifying, assessing and clearing conflicts of interest are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Consistent with embodiments of the present invention, a conflicts management system includes a highly automated, adaptable and intelligent rule-based mechanism for identifying potential conflicts associated with the representation of potential new clients, or new matters for existing clients. In addition, the conflicts management system includes an interactive, self-learning, collaborative clearance module for clearing any identified potential conflicts that are not actual conflicts. In general, the conflicts management system facilitates a two-step process where the first step involves a highly automated process for identifying relevant parties (e.g., business entities, and people) that, if engaged by an attorney of the firm, could pose conflicts of interest problems. This first step is referred to herein as a conflicts checking process. The second step involves a collaborative method for processing a report resulting from the first step so as to quickly and efficiently establish whether a potential conflict is an actual conflict. This second step is generally referred to as clearing conflicts, or a conflicts clearing process.

In some embodiments of the invention, the logic providing the first step (e.g., the conflicts checking process) is embodied in a conflicts identification module that provides various user interface mechanisms by which users (e.g., attorneys and conflicts analysts) can interact with the conflicts management system, including a web-based interface and an e-mail interface. In some embodiments, the conflicts identification module includes a pre-processing module with natural language processing algorithms to convert natural language queries (e.g., received via email) to structured queries that are executed against a variety of internal, and in some cases, external data sources. After executing the search query (or queries) to identify the proper party names to be analyzed, a set of business rules are evaluated to derive one or more scores (e.g., risk scores) that are assigned to the potential new client and any parties identified as being related to the potential new client. The identified parties and their associated risk scores are then communicated in a report to the user who initiated the conflict check request.

Consistent with some embodiments, the report that is communicated to the user is presented as an interactive report, for example, formatted as a web page. For instance, the report may include user interface elements (e.g., buttons, drop down lists, menus, and so forth) that enable the user to quickly communicate with other attorneys who are responsible for an existing client engagement that poses a potential conflict with a new client representation. For instance, an attorney who requested the report may be able to simply press a button displayed in the report to automatically communicate a request to another attorney for additional information about a representation of an existing client who is displayed in the report as a potential adverse party to the potential new client, and for example, inquire as to whether the existing client would be likely to provide a waiver allowing the firm (or attorney) to represent the new client with respect to a particular matter. As such, the conflicts clearing process is highly automated, collaborative in nature, and results in a well documented decision that can be referenced during an audit, if necessary.

In some embodiments, the collaborative conflicts clearing process may also trigger a variety of post-clearance processing tasks. For instance, if and when all identified potential conflicts have been cleared, a variety of post-clearance tasks automatically occur, such as establishing the required client and matter number in various systems for billing purposes. As such, the conflicts management system provides for tight integration with a number of other firm-based resources, such as case management systems, docketing systems, billing, finance, accounting and time entry systems, as well as customer relationship management systems. Other aspects of the inventive subject matter are described below in connection with the description of the attached figures.

Figure 2:
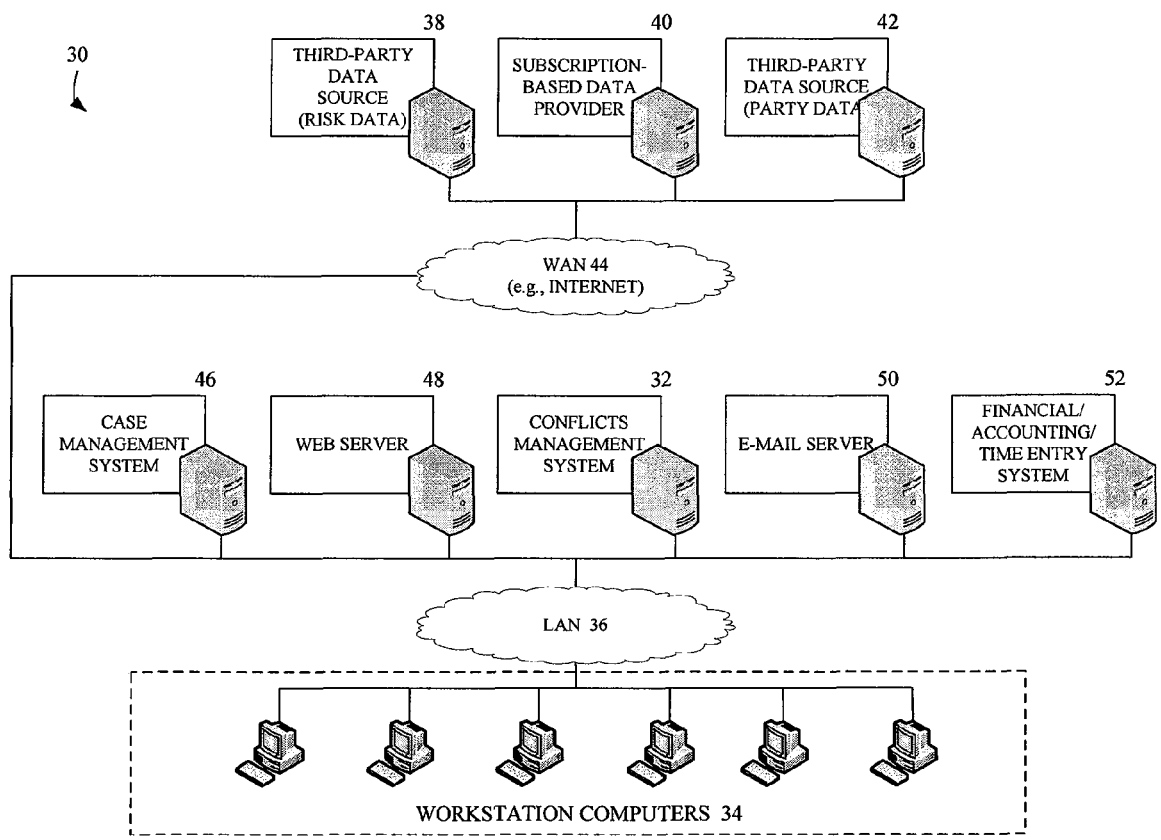
FIG. 2 is a network diagram illustrating a computer network environment in which a conflicts management system, consistent with an embodiment of the invention, might be deployed.

FIG. 2 is a network diagram illustrating a computer network environment 30 in which a conflicts management system 32, consistent with an embodiment of the invention, might be deployed. As illustrated in FIG. 2, the network environment 30 is shown to include a number of workstation computers 34 connected via a local area network 36 to a variety of server computers 32, 46, 48, 50 and 52. In addition, several remote services deployed on remote server computers (e.g., with reference numbers 38, 40 and 42) are connected to the LAN-based workstations 34 and servers 32, 46, 48, 50 and 52 via a wide area network (WAN) 44. As is typical in a law firm setting, each attorney is allocated a workstation computer to access a variety of local and network-based computer resources. The workstation computers illustrated in FIG. 2 are meant to encompass any variety and form factor of computer systems, including, desktop computers, laptop, notebook, or netbook computers, tablet computers, smart phones and other mobile devices. In the example network environment 10 of FIG. 2, the network-based resources, some of which may serve as data sources for the conflicts management system 32, include several server-based services and systems including:

a case management system 46, a web server 48, an e-mail server 50, and a financial/accounting/time entry system 52.

In some embodiments, the conflicts management system 32 includes a variety of data interfaces and/or data integration modules that allow the conflicts management system 32 to access data and services that are external to the conflicts management system 32. For instance, in some embodiments, a data integration module may enable the importing of data from another data source. Similarly, a data interface may provide the ability to query a data source in real time, for example, during the processing of a request to generate a conflicts report. Such data sources may be internal (e.g., on the LAN) or external (e.g., on the WAN). Accordingly, the data interfaces and/or data integration modules provide the conflicts management system with a high degree of integration and interoperability with existing information technology resources and services, including by way of example, a case management system 46, web server 48, e-mail server 50 and financial/accounting and time entry system 52. Of course, in other embodiments, other data sources and services not specifically shown in FIG. 2 may also be integrated with the conflicts management system 32. Furthermore, a variety of external data services may be leveraged by the conflicts management system, for example, to include Dun &Bradstreet, CompliNet, WorldCheck, LexisNexis, Capital IQ, EquiFax, and others.

Consistent with some embodiments, the conflicts management system 32 may include an e-mail server interface enabling the conflicts management system 32 to receive, process, and send e-mails in an automated manner as part of the conflicts management process. In some embodiments, the email integration module may provide for the integration of the conflicts management system 32 with an e-mail server 50, such as Microsoft Exchange Server®. Using the e-mail interface, an attorney may direct an e-mail containing a natural language query to an e-mail address of the conflicts management system 32. Because the conflicts management system 32 is integrated with the e-mail server 50, the e-mail is automatically processed, and the natural language query is converted to generate a structured query. The structured query is processed to identify relevant party data, and associated party attribute data, and then several rules are evaluated, resulting in report data that is automatically communicated back to the requesting attorney in a formatted report, with no additional interaction by a conflicts analyst. By automating the process, attorneys are provided an intuitive e-mail-based interface through which they can interact with the conflicts management system 32 without requiring the assistance of a conflicts analyst.

Similarly, in some embodiments, the conflicts management system 32 may have a web server interface that makes various functionality of the conflicts management system 32 available, via a conventional web browser application, to both local and remote users, including both attorneys and specialized conflicts analysts. Accordingly, in some embodiments, attorneys and/or conflicts analysts interact with the conflicts managements system 32 via a web-based interface. In some embodiments, the web interface may be specifically formatted to support one or more mobile devices, including mobile phones or smart phones. In some embodiments, a native smart phone or mobile phone application may reside and execute on the smart phone or mobile phone device, such that interaction with the conflicts management system is via a client-based application other than a conventional web browser. In some embodiments, the conflicts management system 32 may include or be integrated with a computer-based telephony system or module (not shown), such as an integrated voice response (IVR) unit. Accordingly, in some embodiments, an attorney may interact with the conflicts management system 32 via a telephone. In such a scenario, a speech-to-text conversion process may analyze and convert a spoken request to a text-based structured query.

In some embodiments, the conflicts management system 32 includes one or more data integration modules or data interfaces that provide the conflicts management system 32 with access to other data sources. For instance, in some embodiments, a data integration module may provide access to data residing at a financial system, an accounting system, a time entry system, a case management system, or a customer relationship management system. Accordingly, using a data integration module, data from these various systems may be imported into a primary database of the conflicts management system 32. Alternatively, the data from these systems may be accessed in real time via a data interface as requests for conflict information are being processed by the conflicts management system 32. In addition to local data sources, in some embodiments the conflicts management system 32 may be operable to import data, or query data, from a remote third-party data source. For example, as illustrated in FIG. 2, the third-party data sources with reference numbers 38, 40 and 42 may provide information about various parties (e.g., business entities, officers, directors, employees, and other persons) as well as information that may be used in assessing a level of risk associated with parties. Such information might include financial information, information regarding known links or associations with terrorist or criminal organizations, and information regarding legal proceedings in which an entity or person is a named party, or any other information deemed relevant for purposes of assessing the risk of representing a party. In some embodiments, a third-party data source may provide raw data (e.g., financial information about a party) that can be used in the evaluation of business rules for assessing risk. However, in some cases, the information provided by a third-party data source may be processed data resulting from expert analysis on risk, and might include, for example, a list of parties know to be high-risk such as parties that are politically exposed, linked to terrorism, believed to be involved in money laundering, and so on.

Figure 3:
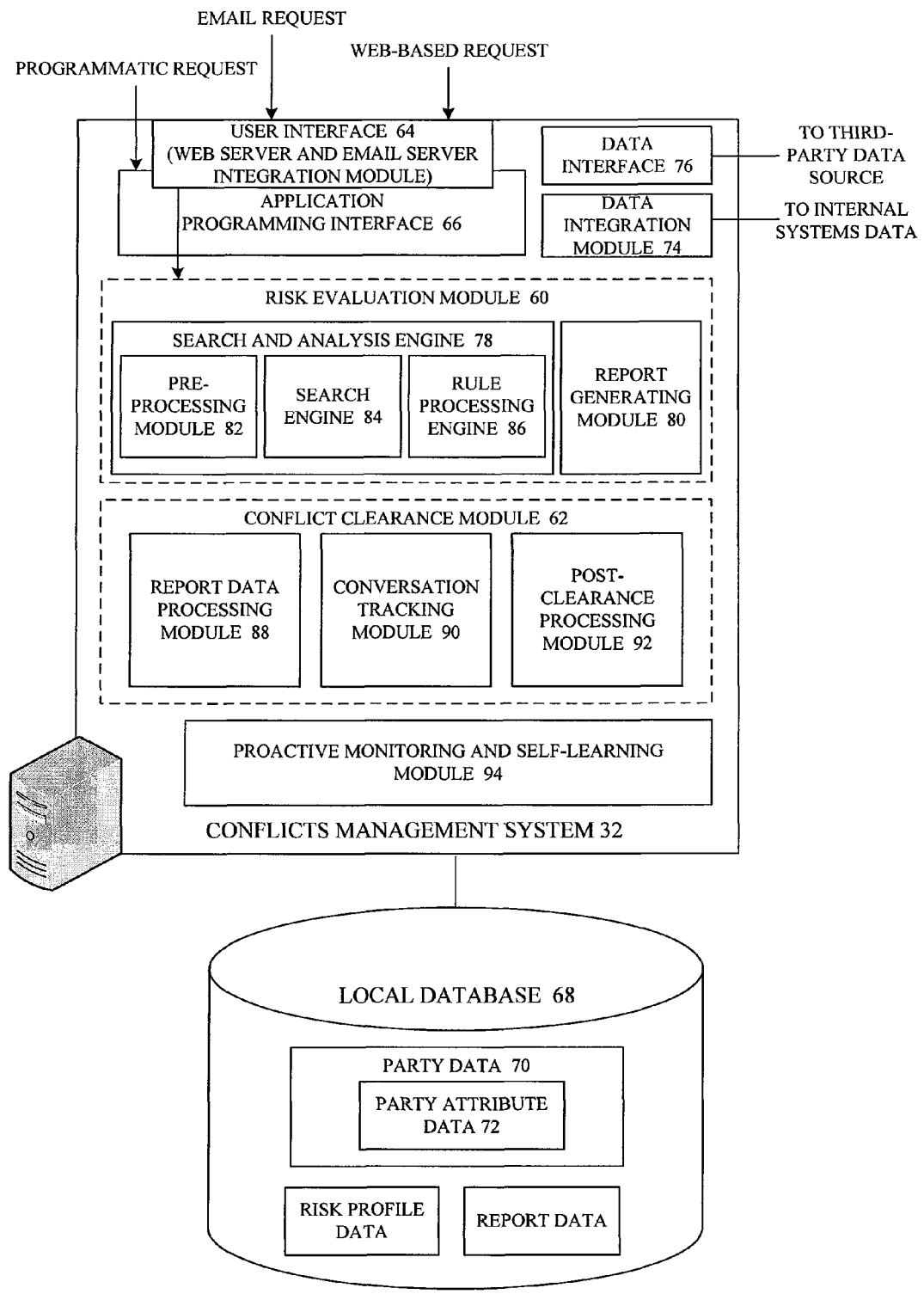
FIG. 3 is a functional block diagram showing, among other components, a risk evaluation module and a collaborative conflict clearing module, included in a conflicts management system, according to an embodiment of the invention.

FIG. 3 is a functional block diagram showing, among other components, a risk evaluation module 60 and a collaborative conflict clearing module 62, both included in a conflicts management system 32, according to an embodiment of the invention. In some embodiments of the invention, the software modules that facilitate the conflicts checking process and the conflicts clearing process are separate, such that the risk evaluation module 60 could operate independently of the conflict clearance module 62. However, in general, the conflict clearance module 62 will be dependent upon the report data generated by the risk evaluation module 60.

In general, users of the conflicts management system 32 will interact with the system 32 via a graphical user interface (GUI), for example, provided by a user interface component 64. In some embodiments, the GUI is web-based, such that interaction with the system occurs via a conventional web-browser application. In some embodiments, the GUI is provided by a desktop client application. In addition, users may interact with the system 32 by both sending e-mails directed to an address associated with the system 32, and by receiving automated response e-mails directly from the system 32. Furthermore, in some embodiments, the conflicts management system 32 includes an application programming interface (API) 66 which provides a programmatic interface to the system 32 for other applications. Accordingly, via the API 66, other internal systems may gain access to data and functionality associated with the conflicts management system 32. For example, in some embodiments, a new business intake module (not shown) may automatically generate one or more requests to generate conflicts check reports. These requests may be communicated to the conflicts management system 32 via the API 66. The new business intake module may be particularly useful for the batch processing of a large number of potential new clients resulting from a group of lateral attorneys joining a law firm.

In FIG. 3, the conflicts management system 32 is shown to be coupled to a local database 68 for storing various types of data, including what is generally referred to herein as "party data" 70. In the context of the present invention, party data 70 includes data that defines and identifies business entities, and the persons that own, operate, and are employed by such business entities. In general, a party can be any person or entity subject to representation by a law firm, and/or subject to the jurisdiction of a particular court. The party data 70 includes not only the specific data that uniquely identifies a party, but also the data that can be utilized in assessing the risk that is posed by representing a particular party. Accordingly, the party data 70 includes what is generally referred to herein as party attributes data 70. Party attributes data 70 might include financial information concerning a particular business entity or person. To the extent a firm or attorney has an existing relationship with a particular party, any billing information or matter-specific information might be utilized as party attributes data 72, for the purpose of assessing the risk of representing that party in a new matter. In some embodiments, party attributes data 72 may include one or more pre-calculated risk scores for a particular party.

Figure 4:
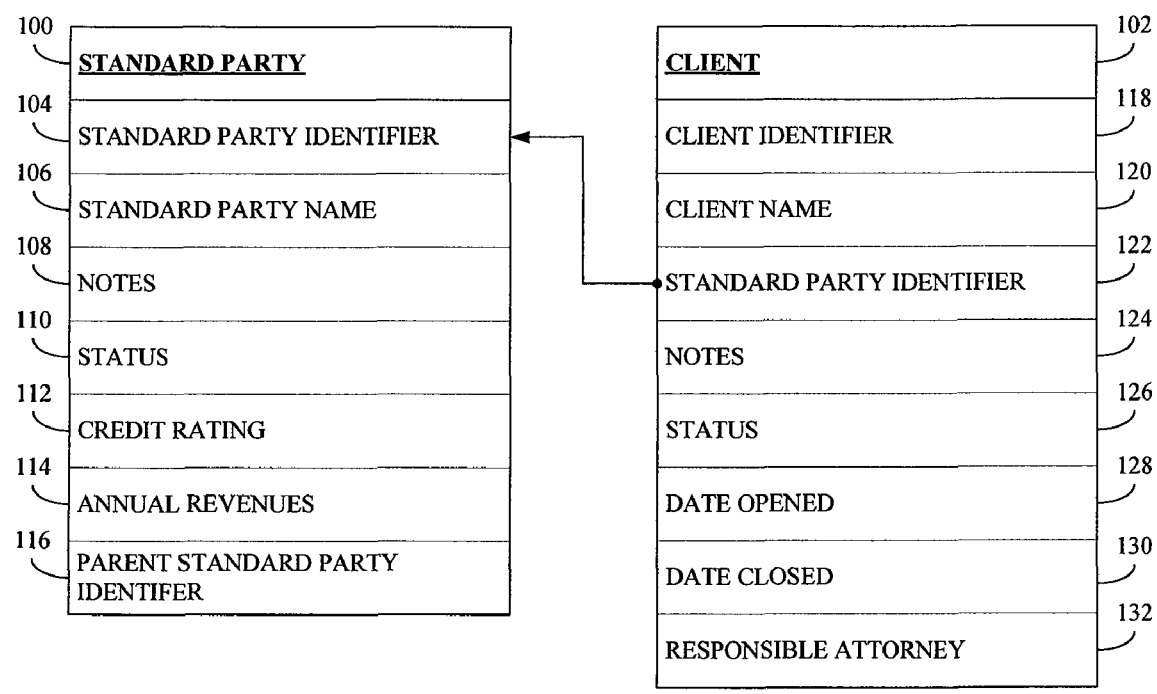
FIG. 4 is a data diagram illustrating an example of two related data structures, including a standard party data structure and a client data structure, according to an embodiment of the invention.

In some embodiments, the party data 70 and party attributes data 72 will be stored within data structures (e.g., database tables), such as those illustrated in FIG. 4. FIG. 4 shows a data diagram illustrating an example of two related data structures, including a standard party data structure 100 and a client data structure 102, according to an embodiment of the invention. Accordingly, information about unique parties may be stored in a standard party data structure 100. In the example presented in FIG. 4, the standard party data structure 100 includes data fields for storing the following data: a party identifier 104, such as a unique system-generated identifier used to uniquely identify a particular party in the system; a party name 106, which identifies the party; notes 108, for example, concerning various aspects of the party; a status 110; a credit rating 112 for the party; annual revenues 114 for the party; and a parent standard party identifier 116, which may identify and link the party to another party, such as an affiliated business entity.

In addition to the standard party data structure 100, there is shown a client data structure 102. In some embodiments, the client data structure 102 includes many data fields specific to the law firm's representation of the client. For instance, in addition to data fields for a client identifier 118, a client name 120, and a standard party identifier 122, the client data structure 102 includes data fields for: notes 124; a status 126, for example, indicating whether the client is an active client, or a closed client no longer being represented by the firm, or other relevant information about the client representation, such as a client contact person; a date opened field 128 for indicating when the client engagement started; a date closed field 130 for indicating when the client representation may have ended; and a responsible attorney field 132 for indicating the attorney or attorneys at the law firm who are primarily responsible for the client representation. Of course, the data fields shown in FIG. 4 are presented as examples to convey a general understanding, and in various embodiments, the data fields may vary considerably from what is specifically depicted in FIG. 4.

Referring again to FIG. 3, in some embodiments, there are several sources of party data 70 including the party attributes data 72. For instance, in some embodiments, one or more data integration modules 74 may be utilized to perform a data import operation to import data from any number of existing data sources, including internal (e.g. law-firm owned and maintained) sources, as well as external, third-party sources. For instance, in some embodiments, the data source may be the firm's existing case management system, billing system, financial or accounting system, time entry system, customer relationship management system, or e-mail system. In some instances, the data import operation facilitated by the data integration module 74 may occur manually on a one-time or periodic basis. Alternatively, the data import operation may occur automatically on a periodically scheduled basis that can be customized.

When party data is imported from another data source with a data integration module 74 the imported data is categorized, indexed and stored in the local database, for example, in data structures or database tables, such as those illustrated in FIG. 4. Accordingly, each data integration module may have a mapping module (not shown) to map certain source data fields to the target data fields to which the data is being imported. This not only allows the party data 70 to be efficiently searched but also allows the party data 70 to be utilized in the evaluation of rules by a rule processing engine 86. For instance, as described in greater detail below, party data 70 serves as an input to a variety of declarative rules, which are used to derive risk scores that are assigned to the parties presented in the conflicts check report. Accordingly, a conflicts check report not only identifies parties that may present conflict issues, but the report provides a measure and type of risk that might be posed by representing the party. Moreover, as described in greater detail below, the rules can be customized and grouped into risk profiles so as to enable the law firm to define the particular types of risk that are of primary concern to the law firm.

In some embodiments, a data interface 76 to another data source may provide a mechanism for querying internal or external data sources in real time or substantially real time, for example, during the processing of a particular request to generate a conflicts check report. For instance, as illustrated in FIG. 3, a data interface 76 is shown coupling the conflicts management system 32 to a third-party data source. In some embodiments, the third-party data source may be a remote subscription-based data source, such that the law firm operating the conflicts management system 32 is required to subscribe to a data service provided by the third-party. In some embodiments the third-party data source may be a data service provided by the software developer who provides the conflict management system 32. Although not specifically shown in FIG. 3, a data interface may also couple the conflicts management system 32 to an internal data source, for example, such as any of the server-based resources illustrated in FIG. 2.

As illustrated in FIG. 3, the risk evaluation module 60 includes a search and analysis engine 78 as well as a report generating module 80. The search and analysis engine 78 includes a pre-processing module 82, a search engine 84, and a rule processing engine 86. In general, the risk evaluation module 60 receives and processes requests to generate conflicts check reports that display, among other things, current client representations that may conflict with a potential new client representation. The request is initially processed by the search and analysis engine 78 of the risk evaluation module 60. In some cases, when a request is first received, it is processed by a pre-processing module 82, which accepts search term(s) and normalizes the search terms consistent with built-in logic and processing options that may be passed to the pre-processing module as parameters. The goal of the pre-processing step is to produce search terms which are likely to result in more accurate hits than would be possible without pre-processing. Once the pre-processing is complete, a search is performed by the search engine 84 to identify relevant parties, such as existing clients that may be adverse to the potential new client, parties that are known to be affiliated with the potential new client, and/or parties that are known to be affiliated with a party designated as a known adverse party. The search engine 84, for example, queries one or more database tables residing in the local database 68, and in some instances, one or more external data sources. Finally, for the potential new client and each party identified to be affiliated with the potential new client, one or more risk scores are generated by evaluating a set of business rules with a rule processing engine 86. The data output of the search and analysis engine 78 is then processed by the report generating module 80 to generate a conflicts check report that is communicated to the user who initiated the request.

A request to generate a conflicts check report may be generated via a variety of user interfaces. Accordingly, the exact steps taken to process the request may vary and be dependent upon the specific format of the received request, as well as the type of request. For example a web-based request may clearly identify and define the entities or parties to be searched, and the particular role each entity or party has in the search request. Specifically, in a web-based request a party may be clearly identified as being a potential new client or a known adverse party. However, in a request received via e-mail, the request may be formatted as a natural language query, such that the parties specified in the request are not clearly denoted with a specific role for the search, such as a potential new client or adverse party. For example, an attorney may specify a natural language query in a request in an e-mail, such as, "Hi, can I represent IBM SemiConductors in a litigation case in the US, NY jurisdiction, against AMD?" As such, an e-mail request may require natural language processing to generate a structured query.

In some embodiments, the natural language processing is facilitated by the pre-processing module 82. For example, when a request is received at the risk evaluation module 60, if the request is formatted as a natural language query, the pre-processing module 82 of the search and analysis engine 78 first performs a number of pre-processing tasks. One such task involves processing the natural language query with a natural language processing algorithm to generate a structured query. In some embodiments, the pre-processing involves logic that performs a set of pre-processing operations by default, as well as several optional pre-processing operations that can be triggered by specifying one or more command parameters with the request, or triggered based on an analysis of the natural language query itself.

In some embodiments, the default pre-processing operations include processing the search terms to remove grammatical suffixes, such that the search term "universities" becomes "university", or modifying verb forms (e.g., by removing "-ing" from gerund verb forms), modifying verbs specified in past tense form (e.g., ending in "ed"), or modifying words specified as comparatives or superlatives (e.g., ending in "-er" or "-est"). In addition, entity names may be compared and or replaced with formal synonyms and the spelling normalized. For example, if "Bank of America" is specified in a request as "B of A" or "BOA", the short form of the entity may be expanded to its more formal name.

In some embodiments, certain pre-processing operations are optionally performed. For example, a parameter passed to the pre-processing module 82 may indicate that search terms are to be stemmed, for example, such that the term "universities" would be shortened to "universit". Additionally, spell checking and phonetic suggestions may be optionally performed, based on a parameter being passed to the pre-processing module 82. In some embodiments, analysis of a natural language query may trigger additional pre-processing operations. In any case, for all pre-processing operations (e.g., default and optional), when pre-processor functionality has been applied to search terms, each resulting term is added as a sub-line to the corresponding original search term. Consequently, the search is expanded by adding additional terms.

After the pre-processing module 82 has generated an expanded search query, the search engine 84 processes the search query to identify relevant parties, and the relevant party attributes data 72 for deriving a risk score for each relevant party identified. In some embodiments, each search query is assigned or otherwise associated with a query type, and the query type indicates the particular data sources that are searched by the search engine 84. For example, a search query that is associated with a request to generate a conflicts check for a client representation involving some type of transactional work may be a different type of search request than one involving a client representation for a litigation matter. Accordingly, in some embodiments, the particular nature of the proposed client representation may dictate that a different type of search is performed. As such, some search queries may be executed against different sources of data depending upon the particular type of request that is being made.

In any case, once the search engine 84 processes the search query or queries against the one or more data sources (e.g., such as the local database 68), the relevant data identified in the search or searches is used as input data for the evaluation of one or more rules by the rule processing engine 86. The rule processing engine 86 processes the rules to derive scores that can be used independently as risk scores, or in some instances, combined for the purpose of generating one or more aggregate risk scores for one or more different categories of risk. For instance, in some embodiments, for each party identified in the search and included in the conflicts search report, the rule processing engine 86 will evaluate one or more rules identifying various party attributes. Based on the evaluation of the party attributes for an identified party, one or more scores are generated to reflect a level of risk for representing that party. In some embodiments, the scores may be normalized and presented via a scale, such as: unranked (0-25% of maximum), low (26-50% of maximum), moderate (51-75% of maximum), and high (76-100% of maximum). Of course, in other embodiments, other scales may be used, such as a green, yellow, and red, where green represents low risk, yellow represents moderate risk, and red represents high risk. In some embodiments, a raw score (e.g., a number) may be reported.

Consistent with some embodiments, a rule is defined as a declarative statement that maps a risk score to the evaluation of a statement that identifies one or more parties, party attribute values, a specified absolute or relative value, and an operator. For example, a rule may take the general form of one of the examples that follow:

IF [New-Adverse-Party's Business-Name] IS SAME AS [Existing-Client's Business-Name] AND [New-Matter's Practice-Area] IS "Litigious" THEN Apply Risk Score "High".

IF [New-Client's Annual-Revenue] IS LESS THAN "$1000000" THEN assign Risk Score "High".

In some instances, multiples rules will be evaluated for each record or party identified in the search. When multiple rules are evaluated, and multiple rules evaluate to TRUE, the final risk score may be computed as follows. The highest risk score of those rules that matched is taken as the base score (e.g., 76% for High). Next, for each additional match (i.e., rule evaluating to TRUE), sorted from higher to lower, an additional score is added as follows. For each moderate match, 10% is added to the score. For each low match, 5% is added to the score. A hard maximum of 100% for the final score is possible if the base score is high. A hard maximum of top moderate value (75%) is possible if base score is medium. A hard maximum of top low value (50%) is possible if base score is low. Of course, in various alternative embodiments, other scoring mechanisms may be utilized. In any case, regardless of the specific rules involved and the particular scoring mechanism utilized, any party attribute data associated with a record (e.g., a standard party record, a client party record, or a matter specific record) can be used in the evaluation of one or more rules for the purpose of establishing a risk score.

In some embodiments, a set of default read-only rules may be provided. In addition, a rule editor (not shown) may provide a mechanism for editing or customizing certain rules, as well as creating new rules, to suit the particular needs of the law firm. In some embodiments, the exact rule or rules that are evaluated will be dependent upon the type of request or query that is specified. For example, FIG. 5 is a diagram illustrating a two-dimensional risk evaluation matrix 134 and several example rules, according to an embodiment of the invention. In some embodiments, the conflicts management system 32 facilitates the creation of what is referred to herein as a risk profile. In general, a risk profile is an expression of query types and rules that allow a law firm to customize the process of assessing and identifying potentially risky client engagements. As illustrated in FIG. 5, the risk matrix 134 represents a mapping of request or query types to a set of rules to be executed for that particular request or query type. For instance, the "X" at the intersection of the first row and second column indicates that a request involving query type 1 will result in rule number 2 being evaluated for any party identified in the processing of query 1. Similarly, for query type 3, rules 3 and 4 are evaluated to assign a risk score to any identified parties.

By mapping rules to query types, a law firm can provide different request or query types for different types of client engagements, or for assessing different types or levels of risk. For example, query type 1 may be written to be suitable in the context of analyzing the risk associated with representing a client in a merger or acquisition. As such, rule 2 would be defined to assess a particular type of risk that the law firm would like to consider in the context of representing a potential new client in a merger or acquisition. Other query types and rules may be established for other types of client engagements, such as large scale litigations, different types of transactional work, different types of deal negotiations and/or lobbying efforts, and so on. Similarly, various rules may be defined to more finely assess a particular type of risk. Accordingly, a first query type may provide only an initial high level risk assessment, whereas a second query type may utilize more stringent rules for more closely assessing the risk involved in a particular representation. By mapping different rules to different request types, the law firm can customize their risk profile to reflect the types, and levels of risk that are of greatest interest to the law firm.

As indicated in FIG. 5, in some embodiments, the rules that are evaluated by the rule processing engine 86 are designed to assess two unique categories of risk. One category of risk is referred to herein as ethical risk or technical risk. Ethical or technical risk is a type of risk defined specifically by rules and regulations, such as the rules established by state bar associations that typically oversee the licensing of attorneys. For instance, in most if not every jurisdiction, lawyers are licensed subject to abiding by certain ethical rules and regulations, including rules designed to prevent lawyers from engaging clients in the face of conflicts of interest. Therefore, the ethical or technical rules are designed to evaluate attorney-client relationships that are specifically prohibited by the rules and regulations of the jurisdictions in which the attorneys are practicing. As such, many of the ethical rules may be default rules, and in some cases, may be read-only, such that they cannot be easily overwritten or modified. Of course, in some embodiments, additional custom rules may be defined, allowing a law firm to assess certain ethical or technical risks that may not be addressed by a default rule. As such, a law firm can apply rules that are more or less stringent than those rules that may be provided by default.

Some example ethical rules are presented in FIG. 5. For instance, the first ethical rule shown in FIG. 5 is a manifestation of a regulation that prohibits the representation of a new client that is already adverse to the firm. The second ethical rule shown in FIG. 5 is a manifestation of a rule or regulation that prohibits the representation of a new client in a matter where the new client is adverse to an existing client of the firm. Similarly, the other rules shown in FIG. 5 deal with situations where a new client may be affiliated, for example, as a subsidiary, or another type of relationship, with another company, and such relationship brings the representation into question because of a potential conflict.

The second general category of risk that can be addressed by a rule is referred to herein as business risk. Business risk encompasses a wide range of risks, including financial risk, risk due to political exposure, or crime, reputation, and so forth. Unlike ethical risk, business risk is generally defined by the business interests of the attorney or law firm. As such, what is considered a negative risk to one firm, may be a desirable risk to another firm. It will be readily appreciated that not all law firms will have the same appetite for certain risk, or define certain risks in the same manner. Although some default rules may be provided, in some embodiments, business rules will generally be customized to suit the needs of the law firm. Consistent with embodiments of the invention, the customization of rules provides for the customization of the definition of risk. For instance, where one law firm desires not to represent clients with certain financial characteristics, another law firm may desire to represent clients with those same financial characteristics. Examples of several business rules are presented in FIG. 5.

In some embodiments, the final risk score for a party identified in a search is calculated by combining the ethical risk score and business risk score according to relative weights given to each of the two categories, for example, by a conflicts analyst. For instance, if the ethical risk category is given the relative weight of 60% and the business risk category the weight of 40%, and a record's ethical risk score is 85%, while its business risk score is 60%, the final combined risk score for the record will be: $((0.85 \times 0.60) + (0.60 \times 0.40)) \times 100 = (0.51 + 0.24) \times 100 = 75\%$. Of course, in other embodiments, the risk scores may be calculated differently, and the weights may be defined by a report template, as described in greater detail below. For example, in some embodiments, each type or category of risk may be reported independently, such that the report includes an ethical risk score and a business risk score for each party identified in the conflicts report.

Once the rule processing engine 86 has processed the rules and saved the relevant resulting data including any generated risk scores, the report generating module 80 generates a displayable report that contains the relevant report data. In some embodiments, report templates can be defined and associated with certain search query or request types, such that the format of the report, and the specific data included in the report are formatted according to a report template defined for the type of search query or request specified. This allows the display and formatting of the report to be customized to best suit its intended audience. Accordingly, if a particular request is of a type for litigation matters, the report can be tailored to include specific information used in evaluating risk in the context of litigation matters. Similarly, if the potential client is inquiring about representation for a matter involving a trust or a will, the initial request for the conflicts report can be specified as a type to match the nature of the potential new client representation (e.g., a search type or category for wills and trusts). Moreover, the report displayed can be tailored to show the information of particular interest to those likely to be initiating the request type with which the report is associated.

After a report has been generated, it may be automatically communicated to the user who initiated the request for the report. In some instances, an email may be communicated to the user, requesting that the user log in to view a web-based report. In any case, a conflicts clearance module 62 provides the report user with a variety of options for clearing conflicts identified in the report. For example, in some embodiments, the user may be able to interact with user interface elements, such as buttons, drop down lists, and so forth, that are displayed in connection with those parties identified as representing a risk. For instance, with an interactive report generated by the report generating module 80, a user may be able to "drill down" to get more detailed information about a party and/or a risk score, for example, by clicking on a link or other user interface element.

As illustrated in FIG. 3, the conflicts clearance module 62 includes a report data processing module 88, a conversation tracking module 90 and a post-clearance processing module 92. In some embodiments, the report data processing module 88 provides a level of interaction with the report by processing data requests that are generated when a user interacts with the report. For instance, if a user selects a particular party identified in a report, the report data processing module may facilitate the retrieval and presentation of additional detailed information about the selected party. Accordingly, the report data processing module 90 provides the user with the ability to query the system for data by simply selecting elements of the report, or the user interface in general.

When viewing a conflict report, in some instances, by simply clicking a button, a user may request more information about a particular party from an attorney who is identified as being responsible for an existing representation of a potentially conflicting client. Similarly, a report may provide the necessary meta-data and user interface elements to enable a user to rapidly request a waiver letter from an attorney representing a client that is potentially causing a conflict in connection with the representation of a new client. In some embodiments, a report data processing module 88 processes the report data as the user interacts with the report, such that the report data processing module 88 routes clearance and waiver requests to the proper attorneys.

In some embodiments, the conversation tracking module 90 provides a mechanism by which various processing events and user communications concerning a particular request can be monitored, stored, and later presented. For example, in some embodiments, when a request to generate a conflicts report is first initiated, a request identifier may be associated with the request. As the request is processed by various modules or components of the system, certain processing operations are logged, for example, by linking the request identifier of the request to a brief description of the processing operation. Accordingly, a user may view a request history report or user interface view that details all of the processing operations that have been performed with respect to a particular request. The request history report or view may identify all of the personnel that have performed certain processing operations, as well as the day and time the processing operations occurred. For instance, the report may indicate when a conflicts analyst performed a particular search query for a particular request. Similarly, the history report may indicate that a conflicts analyst or attorney has eliminated one or more parties identified in the query from further consideration by the rule processing engine.

In some embodiments, processing operations and related user communications may be monitored at a granularity that is finer than the request level. For example, in some embodiments, the concept of a conversation identifier enables communications between users to be captured and associated with requests, queries, rules, reports and/or individual elements of a report, such as a particular party identified in a report. Accordingly, when users of the conflicts management system 32 communicate with one another regarding a particular request, or a particular report, or a particular party identified in a report, a unique conversation identifier may be embedded in the communication allowing the conversation tracking module 90 to link that particular communication with a request, report or party. By tracking user communications that are directly linked to certain processing operations (e.g., the clearing of a particular party identified in a report), the system 32 is able to capture valuable information that was under consideration when certain decisions were made. This provides a level of protection against the loss of valuable information that so frequently occurs when key personnel discontinue their employment with a firm. In addition, this information can be quickly retrieved for purposes of facilitating an audit, if one is ever necessary.

Figure 6:
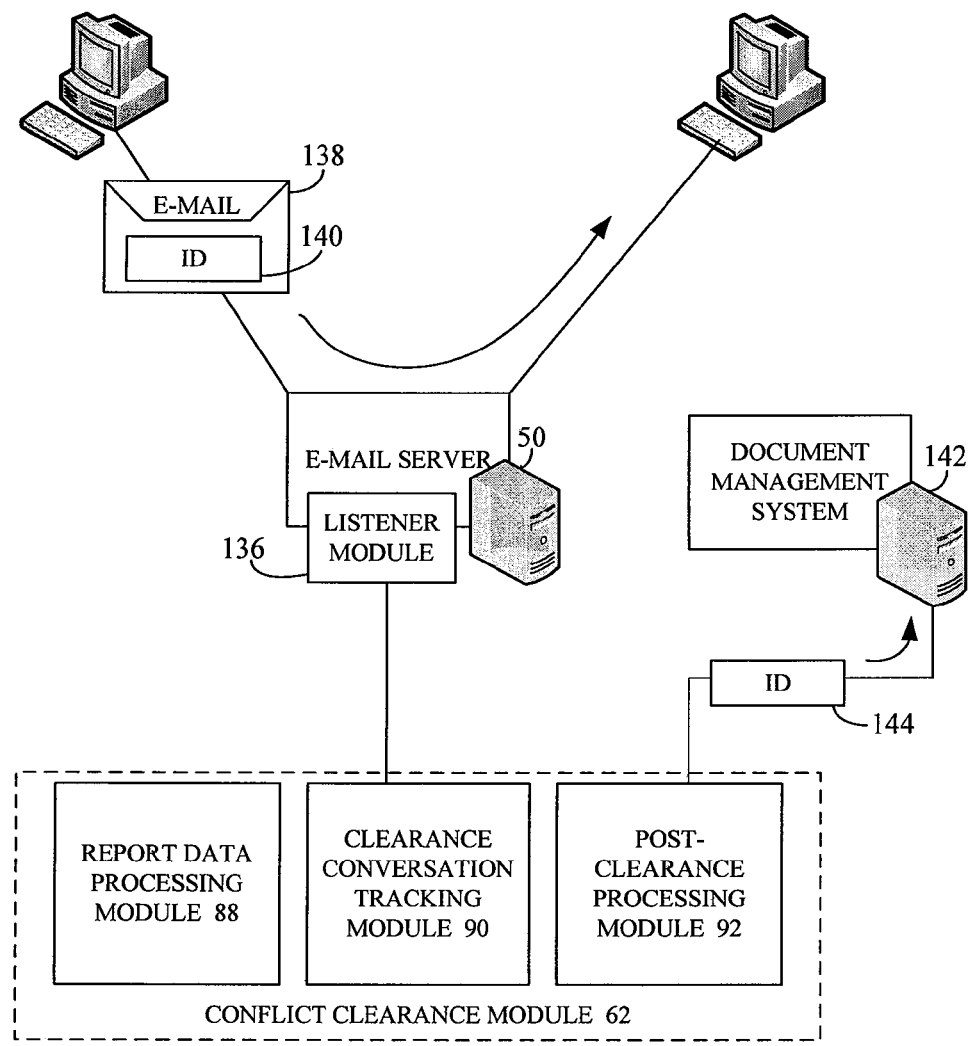
FIG. 6 illustrates a functional block diagram of a conflicts clearance module having an interface with an e-mail server to facilitate the monitoring and archiving of user communications associated with certain processing operations, according to an embodiment of the invention.

FIG. 6 illustrates a functional block diagram of a conflicts clearance module 62 having an interface with an e-mail server 50 to facilitate the monitoring and archiving of user communications associated with certain processing operations, according to an embodiment of the invention. As illustrated in FIG. 6, an e-mail server 50 includes an integrated listener module 136 that analyzes incoming and outgoing e-mails to identify e-mails that may be associated with certain processing operations or system events. For example, in FIG. 6, an e-mail 138 is shown being communicated between two computers via the e-mail server 50 with the integrated listener module 134. When the e-mail is received and processed at the e-mail server 50, the listener module 134 analyzes the e-mail to determine whether the e-mail includes an identifier 140 (e.g., a request identifier, or a conversation identifier) that is utilized by the conflicts management system 32 to link or associate the e-mail 138 with a particular processing operation or activity. If the e-mail includes an identifier 140 defined by the conflicts management system 32, as is the case in the example presented in FIG. 6, a copy of the e-mail is directed to the conversation tracking module 90 of the conflicts clearance module 62. The conversation tracking module 90 process the incoming copy of the e-mail to store or archive the e-mail such that it is linked or associated with a particular processing operation or other system-based activity, such as a request for a conflicts report, an instance of a conflicts report, a party identified in a report, and so on. In general, the identifier 140 included in the e-mail will dictate the particular type of association or link that is made by the conversation tracking module 92. For example, if the e-mail includes a request identifier that uniquely identifies the initial request for the conflicts report, then the request identifier 140 will be used to associate or link the e-mail to the initial request for the conflicts report. In such a scenario, a user can later retrieve all communications that have been linked with that particular request. In other cases, the identifier 140 may be defined such that it is associated with a particular query, or a particular party identified in a particular query. Accordingly, a user may be able to retrieve and view all communications that occurred regarding a particular party identified in a conflicts report as presenting some level of risk, if engaged. Such information may be useful in documenting the information that was considered when the decision to clear a potential conflict presented by a particular party identified in a report was made. Although FIG. 6 illustrates a listener module being integrated with an e-mail server, in various alternative embodiments a listener module may be integrated with other communications platforms, such as an instant messaging system, or other messaging systems. Accordingly, in some embodiments, the conversation tracking module may track e-mail as well as other types of communications.

Figure 7:
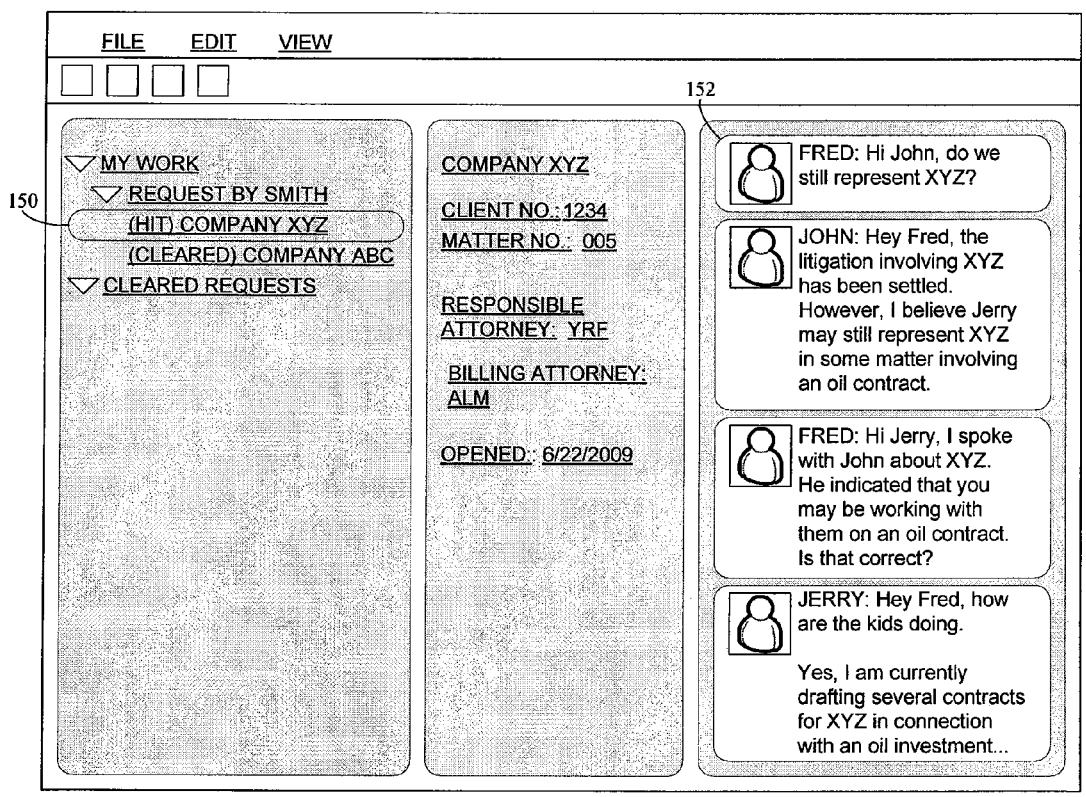
FIG. 7 illustrates a user interface showing a conversation pane with a conversation that has been captured by the conversation tracking module of the conflict clearance module, according to an embodiment of the invention.

FIG. 7 illustrates a user interface showing a conversation pane 152 with a conversation that has been captured by the conversation tracking module 90 of the conflict clearance module 62, according to an embodiment of the invention. As illustrated in the example user interface of FIG. 7, there are three panels or panes displayed. In the first user interface pane on the left most side of the user interface, several user interface elements are displayed, which allow the user to navigate various workflow processes and activities. In this example, the user has selected a search query "hit" 50 representing a particular party (e.g., "Company XYZ") that was identified in a search query associated with a request to generate a conflicts report. By selecting the party, the middle user interface pane displays various party attributes information for the party. In the far right user interface pane 152, a tracked conversation is shown. For example, the tracked conversation includes an e-mail thread between three users of the conflicts management system 32. The e-mail thread provides information regarding the party, "Company XYZ", and may be useful in determining why the party was, or was not cleared, during the conflicts clearing process. Although the information may have any number of uses, the information may be particular valuable in the context of an audit or investigation concerning a decision to represent a particular client.

In some embodiments, the post-clearance processing module 92 provides for various post-clearance processing tasks. For example, if all potential conflicts reported in a particular report are cleared, an engagement letter may be automatically generated with information gathered during the processing of the conflicts check request. Similarly, if a particular client representation is cleared subject to receiving a signed waiver letter from an existing client, a waiver letter may be automatically generated and communicated to the attorney responsible for seeking the signature of the existing client. In some embodiments, the identifiers that are used to associate or link communications to certain processing operations may have additional uses in the conflicts management system 32. For example, an identifier may comprise a unique meta-data tag that can be embedded in documents managed by the document management system. As such, an identifier may facilitate the enforcement of certain document access rules that are in place as a result of a client engagement being undertaken with an ethical wall in place. For example, in certain scenarios, a client engagement may be subject to an ethical wall, such that only certain attorneys in the firm are allowed to actively participate in the engagement, and only certain attorneys are allowed to access documents and other information concerning that client engagement. As illustrated in FIG. 6, an identifier 144 is shown being communicated from the post-clearance processing module 92 of the conflict clearance module 62 to a document management system 142. The identifier 144 may be utilized by the document management system 32 to tag certain documents to indicate that those documents are associated with a particular client engagement that is subject to an ethical wall. Consequently, the document management system 142 can utilize an identifier embedded into a document to prevent unauthorized users (e.g., attorneys) from accessing documents that are associated with a client engagement that is subject to an ethical wall.

Referring again to FIG. 3, in some embodiments, a proactive monitoring and self-learning module 94 provides a mechanism by which certain user-initiated actions are monitored and analyzed for the purpose of fine-tuning various aspects of the system 32. For instance, the proactive monitoring and self-learning module 94 serves as a form of feedback loop, such that, as certain user actions are detected, the actions provide a basis for modifying the parameters of a search query or a rule that is processed by the rule processing engine 86. For instance, when a conflicts analyst or other user interacts with the search results of a particular query, for example, by checking a box or selecting certain results to indicate that those results are not relevant in the context of the particular request that is being processed, the actions of the user may be detected and utilized to modify the parameters of the search query associated with the request to ensure more accurate results in the future. In some instances, the user-initiated actions will be automatically detected, and the resulting changes to the queries or rules will be automatically performed. However, in some instances, a workflow or wizard-like user interface, or some other user interface, may enable the user to provide additional information about why a certain action was taken, so as to provide additional input that can be utilized to fine tune the queries and rules used in generating certain reports.

In some embodiments, the proactive monitoring and self-learning module 94 facilitates a workflow or wizard-like interface by which the reasons for clearing certain conflicts can be assessed and utilized to fine tune the queries and rules utilized for generating a report of a particular type. For example, the proactive monitoring and self-learning module 94 may prompt one or more attorneys involved in the clearance of a potential conflict to answer one or more questions about why the attorney is indicating that the potential conflict is not an actual conflict. Based on the answers provided, the query and/or rules involved in generating that particular report may be modified to more accurately reflect the attorney's or firm's risk profile. For instance, if an attorney indicates to the performance monitoring module 92 that a party identified in the report represents a conflict due to the fact that the party's annual gross revenue is lower than some threshold, an additional rule may be added to the risk matrix for the request or query type that resulted in the particular report. The new rule may be a financial business rule to assess the financial data of parties when deriving risk scores. As such, the performance monitoring module 92 provides a mechanism to modify the queries and rules used in evaluating risk to more accurately represent the firm's risk characteristics, as evidenced by their actions.

In some embodiments, the proactive monitoring and self-learning module 94 may periodically poll certain data sources (internal or external) to retrieve data that can be used for assessing risk involved in the representation of certain parties. In some instances, the proactive monitoring and self-learning module 94 may receive notifications from outside sources concerning data indicating an increase or decrease in a risk score for a potential or existing client. For example, in some embodiments, the proactive monitoring and self-learning module 94 may periodically poll a third-party data source to retrieve and analyze data that is useful in assessing the risk posed by the representation of a particular party. If the proactive monitoring and self-learning module 94 receives data that indicates a sudden change in a risk score associated with a potential new client, or an existing client, the system may generate a notification message (e.g., email) that may be directed to a conflicts analyst or attorney associated with the representation. Similarly, in some embodiments, the proactive monitoring and self-learning module 94 may receive data updates for certain parties, such that the updates indicate when a change has occurred, thereby affecting the level of risk involved in an existing client representation of a particular party. In such a scenario, the proactive monitoring and self-learning module 94 may generate a notification message to bring the change to the attention of a user of the conflicts management system.

Figure 8:
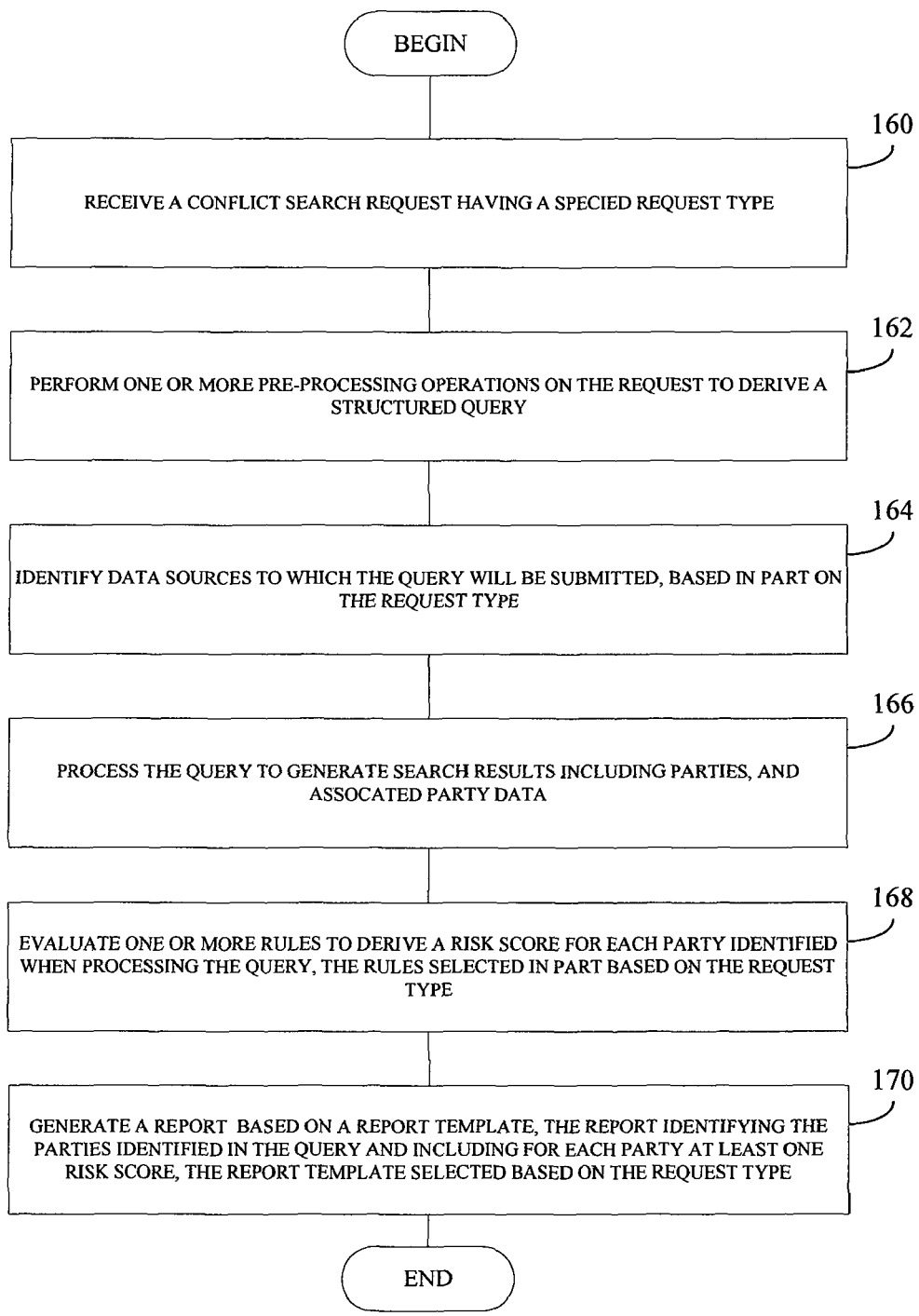
FIG. 8 is a workflow diagram illustrating the method operations involved in a method for generating a conflict report, according to an embodiment of the invention.

FIG. 8 is a workflow diagram illustrating the method operations involved in a method for generating a conflict report, according to an embodiment of the invention. At method operation 160 a conflicts report request having a particular type is received. The conflicts report request may be received via any number of interfaces (e.g., email, web, telephonic), and the type may represent a type of client engagement (e.g., litigation, transactional, patent work, wills or trusts, mergers, and so on) or a type associated with a level or nature of risk to be assessed, or some other classification. At method operation 162, one or more pre-processing operations are performed on the request. For instance, if the request is received as a natural language query, one or more natural language processing steps may be performed to generate a structured query. In some embodiments, one or more parties identified in the request may be analyzed for the purpose of identifying related parties. In any case, the result of method operation 162 is a structured query. At method operation 164, one or more data sources to which the query is to be directed are identified. For instance, depending on the particular type of request, the resulting structured query may be executed against various data sources. At method operation 164, those data sources are identified.

At method operation 166, the structured query is processed to generate search results that include parties and associated party data. The parties identified in the search process typically represent parties that have some relationship to the potential new client or an identified adverse party, such that the parties may present a potential conflict of interest if the new party is actually engaged by the attorney or firm. At method operation 168, one or more rules are evaluated by a rule processing engine to derive one or more risk scores for the parties identified in the query. In some embodiments, the rules derive risk scores for different categories or types of risk, including ethical risk and business risk. In some embodiments, the scores may be combined into an aggregate risk score, while in other embodiments, the scores are reported independently of one another. In some embodiments, the scores may be reported as an aggregate risk score, but an interactive report may enable "drilling down" to retrieve more detailed information about the risk score, including its component risk scores for each category.

Finally, at method operation 170, a report generating module generates a report with the report data. The report data will typically include the parties, certain party attribute data, and one or more risk scores. The report may be generated using a markup language (e.g., such as HTML or XML), and may be displayed and processed such that the report provides a variety of interactive features. For instance, in some embodiments, the report may include the ability to request additional detailed information by simply selecting links (e.g., hyperlinks). Additionally, the report data may include a variety of meta-data that is not explicitly expressed in the report, but can be used in the processing or additional requests associated with the report. For example, the meta-data may include data to indicate which attorney in a law firm is responsible for a particular client engagement. Such meta-data can then be used to direct requests for information to the responsible attorney, including in some cases, requests for waiver letters.

Figure 9:
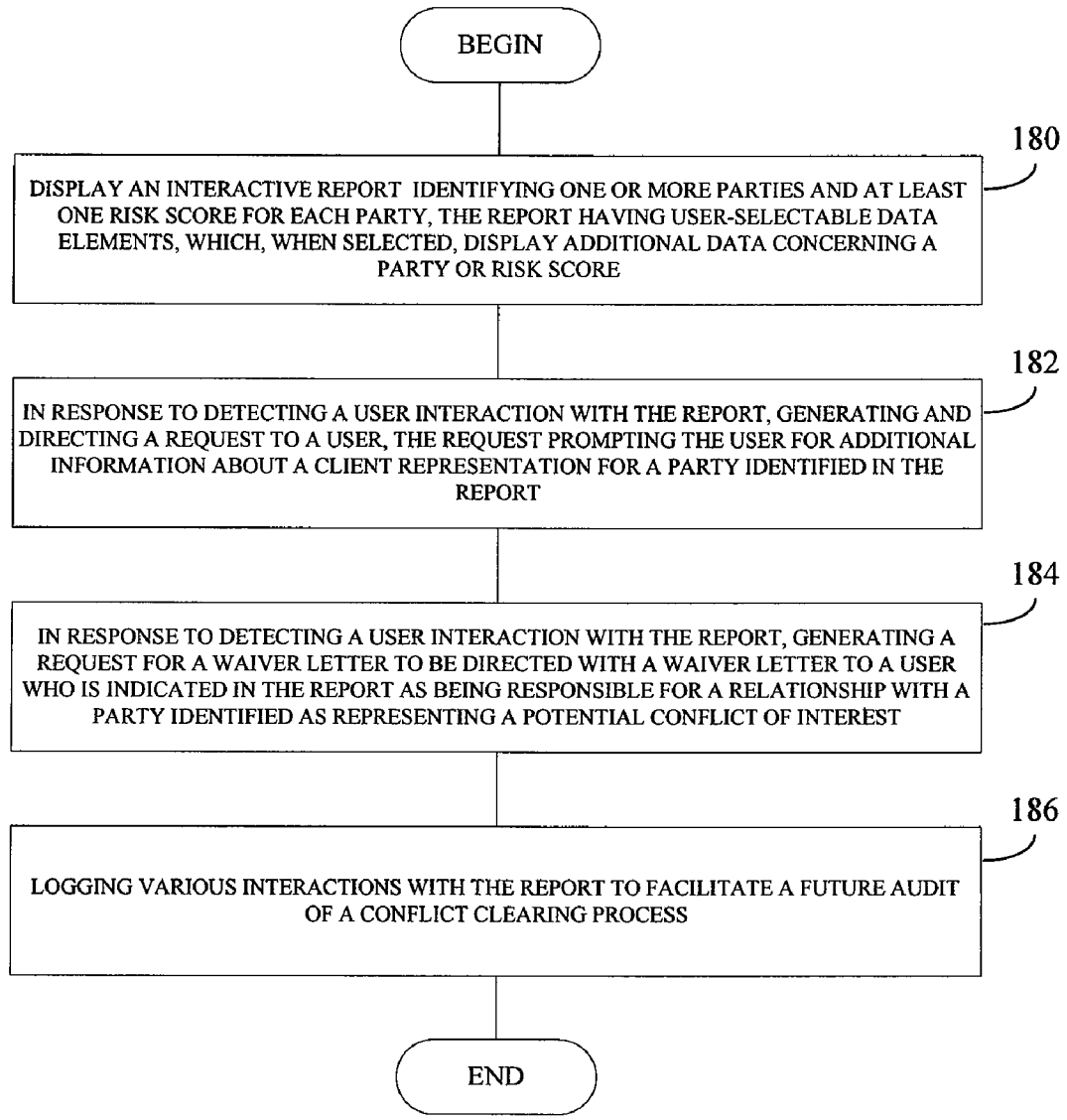
FIG. 9 is a workflow diagram illustrating the method operations involved in a method for clearing potential conflicts identified in a conflicts report, according to an embodiment of the invention.

FIG. 9 is a workflow diagram illustrating the method operations involved in a method for clearing potential conflicts identified in a conflicts report, according to an embodiment of the invention. At method operation 180, a collaborative conflicts clearance module communicates a report to a user who initially requested the generation of the report. The report may be communicated via e-mail or as a web-page. In any case, the report is interactive in nature and identifies various parties and for each party a risk score. The parties identified in the report are typically parties that may give rise to a conflict of interest if a potential new client is engaged by the firm. The report is interactive, at least in the sense that it provides the ability to request additional data regarding any party identified in the report, as well as risk scores associated with the parties, by simply selecting various user interface elements or objects displayed in the report. In addition, various elements of the report may be associated with meta-data, which is not displayed in the report, but is used in the processing of requests associated with the report.

At method operation 182, a user-initiated interaction with the report is detected, and a request for additional information about a current client representation is directed to a user (e.g., an attorney responsible for the existing client engagement). For example, a report user may interact with the report by selecting a button or object displayed near or in association with a party identified in the report. The interaction (e.g., button selection) may cause a message (e.g., email) to be communicated to another user, such as an attorney who is responsible for the existing client representation. In this manner, a user can quickly request additional information from other users of the conflicts management system by simply interacting with report elements displayed in the report. In some instances, meta-data associated with the visible report elements aids in the processing of such report interactions.

At method operation 184, responsive to detecting a second report interaction, a request for a client waiver is generated and communicated to a party responsible for a client engagement that is identified in the report as posing a conflicts issue. For example, in some embodiments, just as a user may request additional information from another user (e.g., attorney), a user may request that an attorney attempt to obtain a waiver from an existing client. The request may be automatically generated and directed to another attorney by simply interacting with various user interface elements provided in the report.

At method operation 186, the various interactions with the report are logged so as to facilitate a future audit process, if one is necessary. For example, in some embodiments, various interactions associated with the report are logged. The log may include a list of persons to whom the report was communicated, including a date and time when the report was viewed by those persons. The log may include log data specifying who cleared each party identified in the report, as well as a date and time the party was cleared. Other data may be logged as well.

It will be appreciated by those skilled in the art that the various method operations illustrated in FIGS. 8 and 9, and described herein, may be performed in an order different from what is shown herein, without departing from the scope and spirit of the invention. Moreover, in various embodiments, certain method operations may be performed by various modules other than those specifically described herein, and may require various levels of human interaction.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 10:
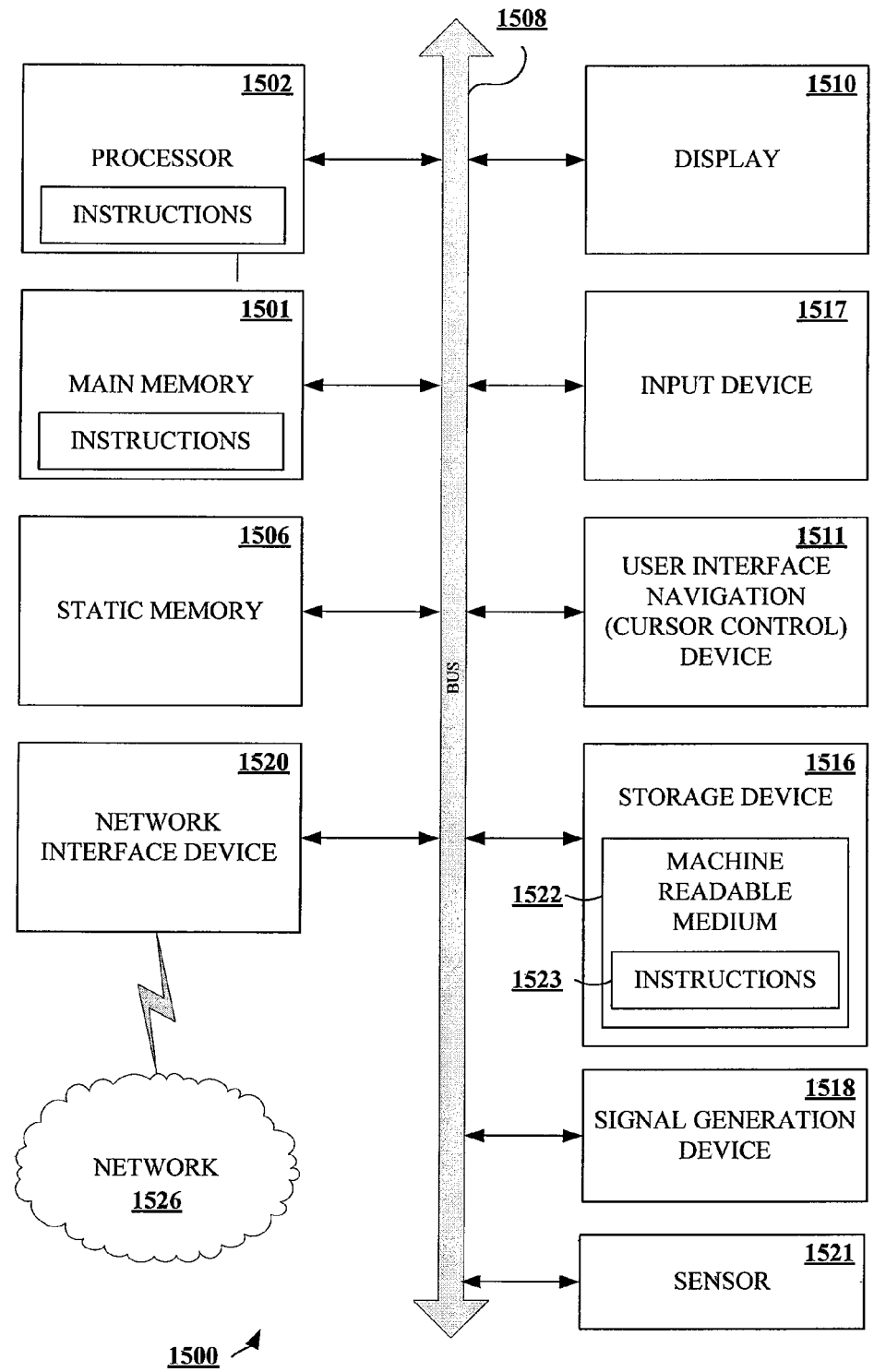
FIG. 10 is a block diagram of a machine in the form of a computer system within which a set of instructions, for causing the machine to perform any one or more of the methodologies discussed herein, may be executed.

FIG. 10 is a block diagram of a machine in the form of a computer system within which a set of instructions, for causing the machine to perform any one or more of the methodologies discussed herein, may be executed. In some embodiments, the machine operates as a stand-alone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
   receiving, at a conflicts management system, a conflict search request having a request type selected from one of a plurality of request types defined by the conflicts management system and identifying a first party representing a potential new client and a second party to whom the first party is known to be adverse;
   selecting a query to be processed and one or more rules to be evaluated based on the request type, the query and the one or more rules part of a risk matrix that maps customizable queries and customizable rules to request types, the queries and rules for use in assessing risk that would be undertaken by engaging the first party, or a party determined to be related to the first party;
   executing the query against a data source to identify additional parties related to the first or second party and to identify party attribute data associated with one or more parties, the party attribute data for use in evaluation of the one or more rules;
   evaluating, using a hardware processor, the one or more rules using as input any one or more of the first party, the second party, any identified additional parties, or any identified party attribute data;
   based on a result obtained from evaluating the one or more rules, assigning to the first party and any identified additional party to which the first party is related a risk score representing a measure of risk that would be undertaken if the first party or any additional party to whom the first party is related is engaged as a client;
   displaying a conflict report including the first party, and any identified additional party to which the first party is related, along with their respective assigned risk scores;
   receiving user-input indicating that a particular party included in the conflict report having a risk score that exceeds a threshold risk score does not represent an actual conflict;
   prompting for and receiving information relevant to the reason why the particular party does not represent an actual conflict; and
   utilizing the received information to modify one or more rules used in assigning the risk score to the particular party.

2. The computer-implemented method of claim 1, wherein the customizable queries and customizable rules of the risk matrix are representative of a firm's risk tolerance, and the customizable queries and customizable rules are to be manually or automatically updated over time to reflect changes in the firm's risk tolerance.

3. The computer-implemented method of claim 1, wherein the data source includes data associated with a prior client representation that has been imported from a data source external to the conflicts management system and has been structured, during the operation to import the data, for use as custom defined party attribute data in the evaluation of the one or more rules.

4. The computer-implemented method of claim 3, wherein the data imported from the data source external to the conflicts management system includes data imported from any one or more of: a case management system, a financial management system, an accounting system, a billing time entry system, a conflicts management system, a customer relationship management (CRM) system, or an enterprise resource planning (ERP) system.

5. The computer-implemented method of claim 1, wherein executing the query against a data source includes executing the query against a data source external to the conflicts management system.

6. The computer-implemented method of claim 1, further comprising:
   receiving input indicating that a particular party identified as a result of executing the query is not relevant with respect to the conflict search request; and
   modifying one or more parameters of the query to improve the accuracy of the query with respect to the risk score.

7. The computer-implemented method of claim 1, wherein evaluating the one or more rules includes evaluating a business rule intended to assess a level of business risk that would be undertaken if the first party, or any additional party to whom the first party is related, is engaged as a client, the business rule to evaluate party attribute data that has been defined by an end-user of the conflicts management system.

8. The computer-implemented method of claim 1, wherein executing the query against a data source includes selecting the data source based on the request type.

9. The computer-implemented method of claim 1, wherein the conflict search request is received as a natural language query, the method further comprising:
   utilizing a natural language algorithm in a pre-processing operation to process the natural language query and formulate a structured query.

10. A conflicts management system comprising:
    a machine-readable medium in communication with at least one processor, the machine readable medium storing instructions that are executable by the at least one processor, the instructions being executed by the at least one processor to cause operations to be performed, the operations comprising:
    receiving, at a conflicts management system, a conflict search request having a request type selected from one of a plurality of request types defined by the conflicts management system and identifying a first party representing a potential new client and a second party to whom the first party is known to be adverse;
    selecting a query to be processed and one or more rules to be evaluated based on the request type, the query and the one or more rules part of a risk matrix that maps customizable queries and customizable rules to request types, the queries and rules for use in assessing risk that would be undertaken by engaging the first party, or a party determined to be related to the first party;
    executing the query against a data source to identify additional parties related to the first or second party and to identify party attribute data associated with one or more parties, the party attribute data for use in evaluation of the one or more rules;
    evaluating the one or more rules using as input any one or more of the first party, the second party, any identified additional parties, or any identified party attribute data;

based on a result obtained from evaluating the one or more rules, assigning to the first party and any identified additional party to which the first party is related a risk score representing a measure of risk that would be undertaken if the first party or any additional party to whom the first party is related is engaged as a client;

displaying a conflict report including the first party, and any identified additional party to which the first party is related, along with their respective assigned risk scores;

receiving user-input indicating that a particular party included in the conflict report having a risk score that exceeds a threshold risk score does not represent an actual conflict;

prompting for and receiving information relevant to the reason why the particular party does not represent an actual conflict; and utilizing the received information to modify one or more rules used in assigning the risk score to the particular party.

11. The conflicts management system of claim 10, wherein the customizable queries and customizable rules of the risk matrix are representative of a firm's risk tolerance, and the customizable queries and customizable rules are to be manually or automatically updated over time to reflect changes in the firm's risk tolerance.

12. The conflicts management system of claim 10, wherein the data source includes data associated with a prior client representation, the conflicts management system further comprising:
a data integration module to import data from a data source external to the conflicts management system, and to structure the imported data for use as custom defined party attribute data for use in the evaluation of the one or more rules.

13. The conflicts management system of claim 12, wherein the data imported from the data source external to the conflicts management system includes data imported from any one or more of: a case management system, a financial management system, an accounting system, a billing time entry system, a conflicts management system, a customer relationship management (CRM) system, or an enterprise resource planning (ERP) system.

14. The conflicts management system of claim 10 further comprising:
a data interface for executing the query against a data source external to the conflicts management system.

15. The conflicts management system of claim 10, further comprising:
receiving input indicating that a particular party identified as a result of executing the query is not relevant with respect to the conflict search request; and
modifying one or more parameters of the query to improve the accuracy of the query with respect to the risk score.

16. The conflicts management system of claim 10, wherein evaluating the one or more rules includes evaluating a business rule intended to assess a level of business risk that would be undertaken if the first party, or any additional party to whom the first party is related, is engaged as a client, the business rule to evaluate party attribute data that has been defined by an end-user of the conflicts management system.

17. The conflicts management system of claim 10, wherein executing the query against a data source includes selecting the data source based on the request type.

18. The conflicts management system of claim 10, wherein the conflict search request is received as a natural language query, the method further comprising:
utilizing a natural language algorithm in a pre-processing operation to process the natural language query and formulate a structured query.

19. A computer-readable storage device storing instructions, which, when executed by a computer, cause the computer to perform a method comprising:
receiving, at a conflicts management system, a conflict search request having a request type selected from one of a plurality of request types defined by the conflicts management system and identifying a first party representing a potential new client and a second party to whom the first party is known to be adverse;

selecting a query to be processed and one or more rules to be evaluated based on the request type, the query and the one or more rules part of a risk matrix that maps customizable queries and customizable rules to request types, the queries and rules for use in assessing risk that would be undertaken by engaging the first party, or a party determined to be related to the first party;

executing the query against a data source to identify additional parties related to the first or second party and to identify party attribute data associated with one or more parties, the party attribute data for use in evaluation of the one or more rules;

evaluating the one or more rules using as input any one or more of the first party, the second party, any identified additional parties, or any identified party attribute data;

based on a result obtained from evaluating the one or more rules, assigning to the first party and any identified additional party to which the first party is related a risk score representing a measure of risk that would be undertaken if the first party or any additional party to whom the first party is related is engaged as a client;

displaying a conflict report including the first party, and any identified additional party to which the first party is related, along with their respective assigned risk scores;

receiving user-input indicating that a particular party included in the conflict report having a risk score that exceeds a threshold risk score does not represent an actual conflict;

prompting for and receiving information relevant to the reason why the particular party does not represent an actual conflict; and utilizing the received information to modify one or more rules used in assigning the risk score to the particular party.

* * * * *